United States Patent
Baba et al.

(10) Patent No.: US 9,527,467 B2
(45) Date of Patent: Dec. 27, 2016

(54) CONTROL DEVICE FOR VEHICLE

(75) Inventors: Noriyoshi Baba, Tokyo (JP); Tetsuya Nakase, Tokyo (JP); Isamu Nagasawa, Tokyo (JP)

(73) Assignee: FUJI JUKOGYO KABUSHIKI KAISHA, Tokyo (JP)

( * ) Notice: Subject to any disclaimer, the term of this patent is extended or adjusted under 35 U.S.C. 154(b) by 443 days.

(21) Appl. No.: 13/526,388

(22) Filed: Jun. 18, 2012

(65) Prior Publication Data

US 2013/0006477 A1 Jan. 3, 2013

(30) Foreign Application Priority Data

Jun. 30, 2011 (JP) .................. 2011-146692

(51) Int. Cl.
*B60R 21/0132* (2006.01)
*G06F 19/00* (2011.01)
*B60R 21/013* (2006.01)

(52) U.S. Cl.
CPC .. B60R 21/0132 (2013.01); *B60R 2021/01306* (2013.01); *B60R 2021/01313* (2013.01)

(58) Field of Classification Search
CPC .................. B60R 21/0132; B60R 2021/01211; B60R 2021/01218; B60R 2021/01225; B60R 2021/01231; B60R 2021/01238; B60R 2021/01245; B60R 2021/01313; B60R 2300/8086; B60R 2021/01306; B60W 30/095; B60W 30/0953; B60W 30/0956; B60W 30/10; B60W 30/12; B60W 30/14; B60W 30/18145; B60W 30/18163; B60W 30/18172; B60W 40/101; B60W 40/103; B60W 2030/08; B60W 2520/06; B60W 2520/20; B60W 2520/26; B60W 2520/263; B60W 2520/266
USPC .................................... 701/45, 75
See application file for complete search history.

(56) References Cited

U.S. PATENT DOCUMENTS

2005/0177308 A1* 8/2005 Tange et al. ............... 701/301

FOREIGN PATENT DOCUMENTS

JP 2001-071844 A 3/2001

\* cited by examiner

*Primary Examiner* — Jerrah Edwards
(74) *Attorney, Agent, or Firm* — McGinn IP Law Group, PLLC.

(57) ABSTRACT

There is provided a control device for vehicle. A sideslip speed which is the moving speed of a vehicle in the width direction is calculated on the basis of an estimated running position of the vehicle after a predetermined time interval has elapsed from a time at a starting running position of the vehicle on the estimated running path, and the actual running position of the vehicle after the predetermined time interval has elapsed from the time at the starting running position of the vehicle on the estimated running path.

9 Claims, 9 Drawing Sheets

CONTROL DEVICE FOR VEHICLE

CROSS-REFERENCE TO RELATED APPLICATIONS

The present application claims priority from Japanese Patent Application No. 2011-146692 filed on Jun. 30, 2011, the entire contents of which are hereby incorporated by reference.

BACKGROUND OF THE INVENTION

1. Field of the Invention

The present invention relates to a control device for a vehicle, which determines whether or not an air bag is to be deployed in the cabin inward from a window on a side of the vehicle, for example, when a vehicle rolls over, in accordance with a running state of the vehicle.

2. Description of the Related Art

Conventionally, as this type of control device for a vehicle, there has been known a control device having an acceleration sensor which can detect an acceleration in the width direction of the vehicle. The control device for a vehicle calculates a sideslip speed of the vehicle on the basis of a result of the detection made by the acceleration sensor, and changes a threshold value for determining a possibility of a roll-over in accordance with the calculated sideslip speed (for example, see Japanese Unexamined Patent Application Publication No. 2001-71844).

The above-mentioned control device for a vehicle calculates a sideslip speed of the vehicle by integrating the acceleration in the width direction, which is detected by the acceleration sensor. The sideslip speed calculated from the acceleration detected by the acceleration sensor is significantly deviated from the actual sideslip speed, and it is difficult to obtain an accurate sideslip speed. Therefore, it is difficult to deploy an air bag at an accurate timing with the above-mentioned control device for a vehicle.

SUMMARY OF THE INVENTION

It is an object of the present invention to provide a control device for a vehicle that can obtain an accurate sideslip speed of the vehicle.

In order to achieve the above-mentioned object, a first aspect of the invention provides a control device for a vehicle that controls a device provided in the vehicle in accordance with a running state of the vehicle, the control device including: a speed detection unit that detects a running speed of the vehicle; a steering angle detection unit that detects a steering angle of the vehicle; an image-capturing unit that is capable of capturing a path on which the vehicle runs or a neighborhood thereof; a running position calculation unit that is capable of calculating a position of the vehicle based on an image captured by the image-capturing unit; an estimated running path calculation unit that calculates an estimated running path of the vehicle based on a running speed detected by the speed detection unit, a steering angle of the vehicle detected by the steering angle detection unit, and a position of the vehicle calculated by the running position calculation unit; and a sideslip speed calculation unit that calculates a sideslip speed which is a moving speed of the vehicle in a width direction, on the basis of an estimated running position of the vehicle on an estimated running path after a predetermined time interval has elapsed from a time at a starting running position of the vehicle, and an actual running position of the vehicle on the estimated running path after the predetermined time interval has elapsed from the time at the starting running position of the vehicle, the estimated running path being calculated by the estimated running path calculation unit.

In order to achieve the above-mentioned object, a second aspect of the invention provides a control device for a vehicle that controls a device provided in the vehicle in accordance with a running state of the vehicle, the control device including: a speed detection unit that detects a running speed of the vehicle; a steering angle detection unit that detects a steering angle of the vehicle; a position acquisition unit that is capable of acquiring a position of the vehicle by receiving a signal from a satellite for positioning; an estimated running path calculation unit that calculates an estimated running path of the vehicle based on a running speed detected by the speed detection unit, a steering angle of the vehicle detected by the steering angle detection unit, and a position of the vehicle acquired by the position acquisition unit; and a sideslip speed calculation unit that calculates a sideslip speed which is a moving speed of the vehicle in a width direction, on the basis of an estimated running position of the vehicle on an estimated running path after a predetermined time interval has elapsed from a time at a starting running position of the vehicle, and an actual running position of the vehicle on the estimated running path after the predetermined time interval has elapsed from the time at the starting running position of the vehicle, the estimated running path being calculated by the estimated running path calculation unit.

In order to achieve the above-mentioned object, a third aspect of the invention provides a control device for a vehicle that controls a device provided in the vehicle in accordance with a running state of the vehicle, the control device including: a speed detection unit that detects a running speed of the vehicle; a steering angle detection unit that detects a steering angle of the vehicle; a position acquisition unit that is capable of acquiring a position of the vehicle by receiving a signal from a side of a road on which the vehicle runs; an estimated running path calculation unit that calculates an estimated running path of the vehicle based on a running speed detected by the speed detection unit, a steering angle of the vehicle detected by the steering angle detection unit, and a position of the vehicle acquired by the position acquisition unit; and a sideslip speed calculation unit that calculates a sideslip speed which is a moving speed of the vehicle in a width direction, on the basis of an estimated running position of the vehicle on an estimated running path after a predetermined time interval has elapsed from a time at a starting running position of the vehicle, and an actual running position of the vehicle on the estimated running path after the predetermined time interval has elapsed from the time at the starting running position of the vehicle, the estimated running path being calculated by the estimated running path calculation unit.

In this manner, the sideslip speed of the vehicle is calculated based on the actual running position of the vehicle, thus an accurate sideslip speed of the vehicle is calculated. Therefore, accuracy in the control of a device relating to the operation and safety of the vehicle can be improved.

DETAILED DESCRIPTION OF THE INVENTION

FIGS. 1 to 7 illustrate the first embodiment of the present invention.

Figure 1:
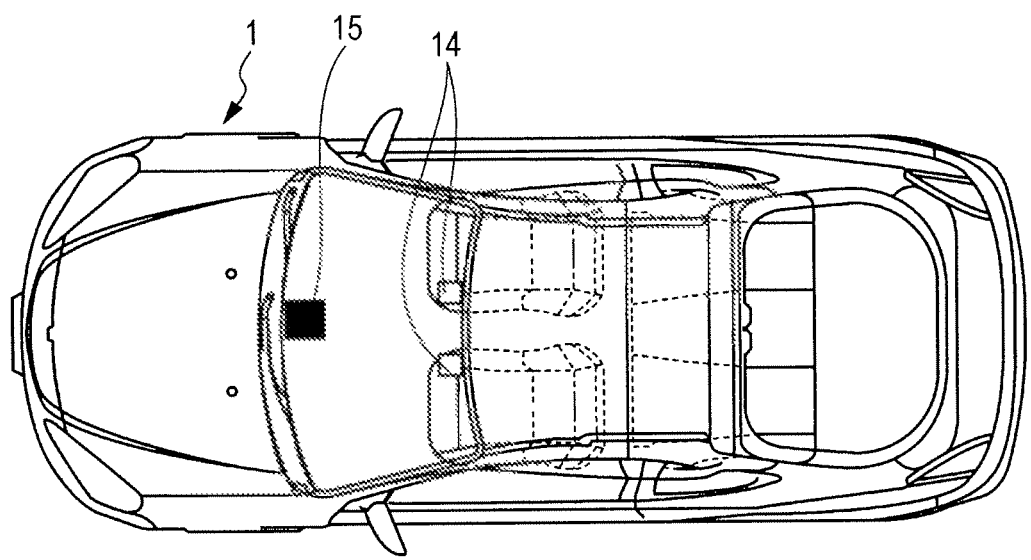
FIG. 1 is a plan view of a vehicle according to a first embodiment of the invention.

A control device for a vehicle according to the present invention is provided in a vehicle 1 illustrated in FIG. 1 and configured to determine a roll-over situation of the vehicle 1 on the basis of the running state of the vehicle 1 and to deploy an air bag in the cabin inward from a window on a side of the vehicle.

The control device for a vehicle includes a controller 10 configured to control the timing of deployment of the air bag on the basis of the running state of the vehicle.

The controller 10 has a CPU, a ROM, and a RAM. In response to receiving an input signal from a device connected to an input side of the controller 10, the CPU of the controller 10 reads a program stored in the ROM in accordance with the input signal, and stores a state in the RAM, the state being detected using the input signal, or transmits an output signal to a device connected to an output side of the controller 10.

Figure 2:
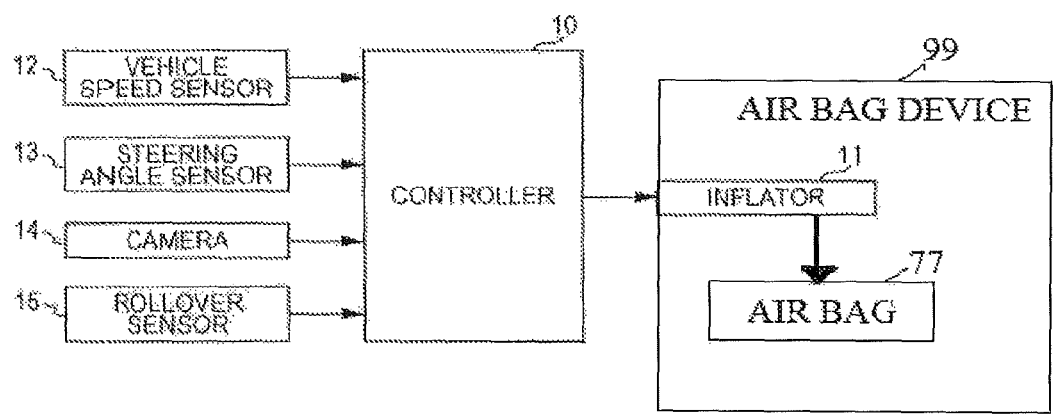
FIG. 2 is a block diagram illustrating a control system.

As illustrated in FIG. 2, an air bag device 99 includes an inflator 11 for deploying an air bag 77 and is connected to the output side of the controller 10. The controller 10 transmits a signal to the air bag device 99 which causes the inflator 11 to generate a gas for deploying the air bag 77.

As illustrated in FIG. 2, a vehicle speed sensor 12 for detecting the running speed of the vehicle 1, a steering angle sensor 13 for detecting a steering angle of the steering wheel of the vehicle 1, a camera 14 for capturing a running direction of the vehicle 1, and a rollover sensor 15 for detecting a roll-over state of the vehicle 1 are connected to the input side of the controller 10. The controller 10 receives a signal related to the speed of the vehicle 1, a signal related to the steering angle of the steering wheel, a signal of an image captured by the camera 14, and a signal related to a roll-over state of the vehicle 1.

The camera 14 includes CCD cameras or the like, and captures the front view from the inside of the cabin through the windshield. In addition, by capturing an image with a pair of the CCD cameras, the camera 14 can process the captured image three-dimensionally, and thus can measure the distance between the vehicle and a predetermined point in the captured image.

The rollover sensor 15 includes an angular speed detection unit which can detect an angular speed RR in the rotation direction of roll-over of the vehicle 1, and an acceleration detection unit which can detect an acceleration of the vehicle 1 in the width direction. The controller 10 can calculate an angle RA in the rotation direction of roll-over of the vehicle 1 by integrating the angular speed RR detected by the angular speed detection unit.

Figure 3A:
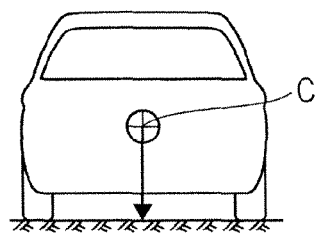
FIG. 3 is an illustration depicting the relationship between the center of gravity of the vehicle and the posture of the vehicle.
Figure 3B:
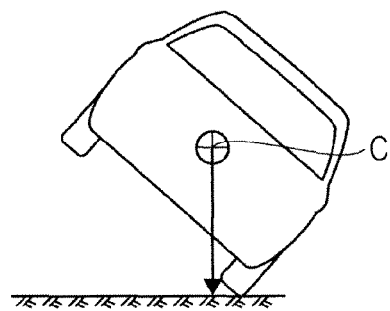
Figure 3C:
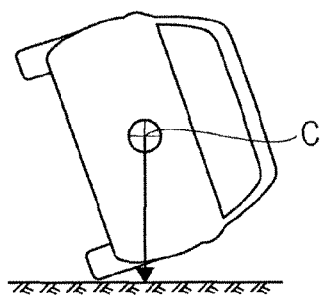

The vehicle 1 rotates in the direction of roll-over from the state illustrated in FIG. 3A. As illustrated in FIG. 3B, the vehicle 1 does not roll over in a state where the center of gravity C is located inside in the width direction with respect to the contact point of the vehicle 1 with the ground. However, as illustrated in FIG. 3C, the vehicle 1 rolls over in a state where the center of gravity C is located outside in the width direction with respect to the contact point of the vehicle 1 with the ground.

Figure 4:
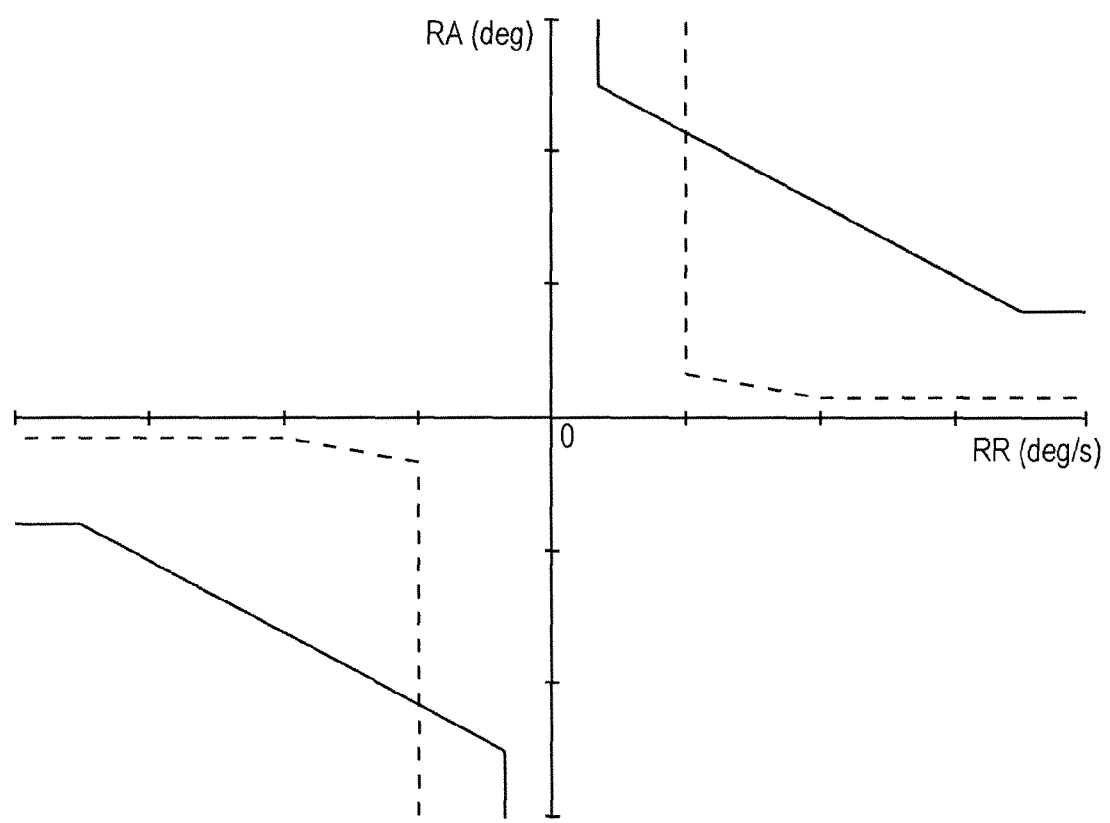
FIG. 4 is a graph illustrating a roll-over determination map.

Whether or not the vehicle 1 rolls over is determined on the basis of the roll-over determination map in FIG. 4, which indicates the relationship between the angular speed RR and the angle RA in the rotation direction of roll-over of the vehicle 1. The roll-over determination map is stored in the ROM of the controller 10. The horizontal axis of FIG. 4 is associated with the angular speed RR. The right side where the angular speed RR is greater than 0 corresponds to a range of angular speeds RR in the case where the vehicle 1 rolls in the right direction, while the left side where the angular speed RR is less than 0 corresponds to a range of angular speeds RR in the case where the vehicle 1 rolls in the left direction. The vertical axis of FIG. 4 is associated with the angle RA. The upper side where the angle RA is greater than 0 corresponds to a range of angles RA in the case where the vehicle 1 rolls in the right direction, while the lower side where the angle RA is less than 0 corresponds to a range of angles RA in the case where the vehicle 1 rolls in the left direction. In the roll-over determination map, a solid line indicates a first boundary line that is a reference boundary line for determination in a normal state, while a dashed line indicates a second boundary line that is a reference boundary line for determination in a state where a roll-over tends to occur more easily than in a normal state. Either one of the first boundary line and the second boundary line is set on the basis of the below-described sideslip speed of the vehicle 1. In the roll-over determination map, it is determined that the vehicle 1 does not roll over in the region including the origin, while it is determined that the vehicle 1 rolls over in the region not including the origin.

Figure 5A:
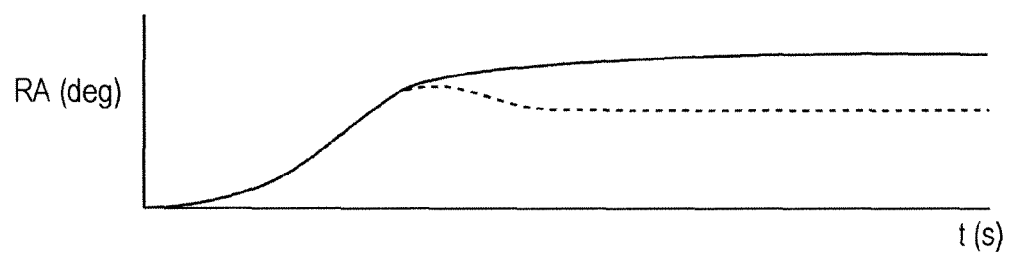
FIG. 5A is a graph illustrating the relationship between time and roll angle of a vehicle while the vehicle is turning.
Figure 5B:
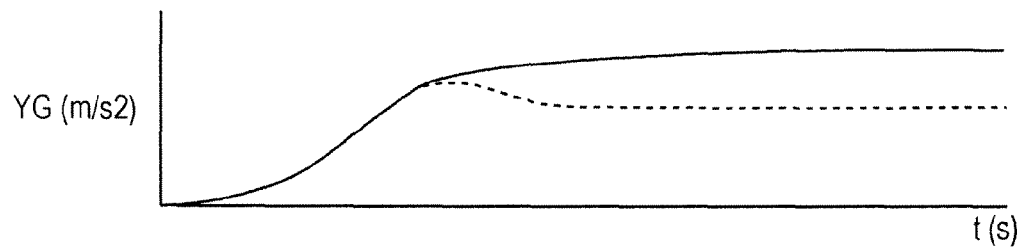
FIG. 5B is a graph illustrating the relationship between time and acceleration of a vehicle in the width direction while the vehicle is turning.

The state illustrated in FIG. 4 where a roll-over tends to occur more easily than in a normal state indicates a case illustrated by the dashed line of FIG. 5A where a sideslip occurs in the vehicle 1 so as to decrease the angle RA in the relationship between time t and the angle RA in the direction of roll-over of the vehicle 1 while the vehicle 1 is turning. The case illustrated by the dashed line of FIG. 5B where a sideslip of the vehicle 1 occurs so as to decrease an acceleration YG in the width direction of the vehicle 1 in the relationship between time t and the acceleration YG in the width direction of the vehicle 1 while the vehicle 1 is turning is also the state where a roll-over tends to occur more easily than in a normal state.

Figure 6:
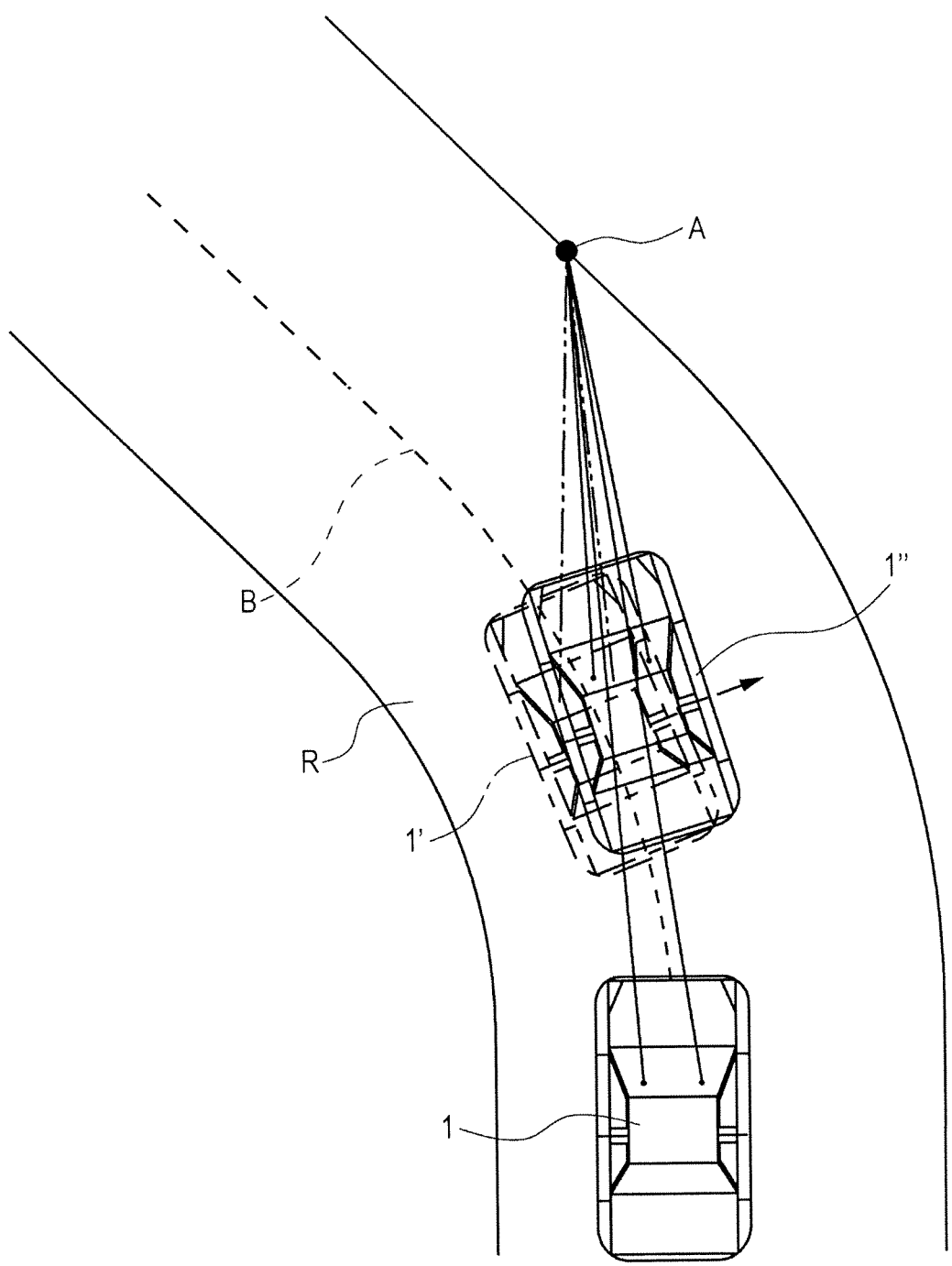
FIG. 6 is an illustration depicting a sideslip state of a vehicle while the vehicle is turning.
Figure 7:
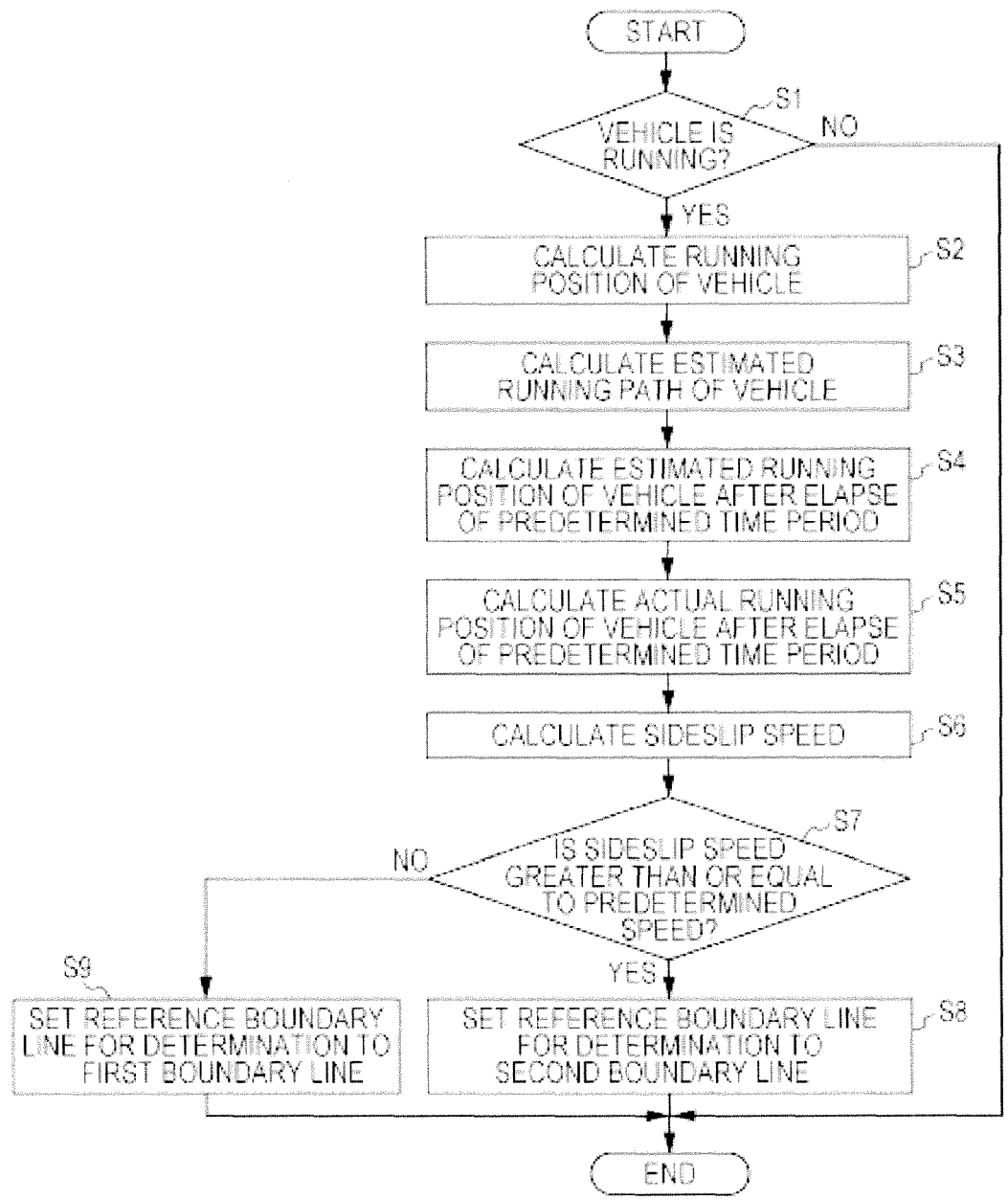
FIG. 7 is a flowchart illustrating the processing of switching the reference for determination of sideslip.

In the control device for a vehicle configured in the above-described manner, the controller 10 performs the processing of switching the reference for determination of sideslip when the vehicle 1 turns along a road R, as illustrated in FIG. 6. The operation of the controller 10 in this processing is described with reference to the flowchart of FIG. 7.

(Step S1)

In step S1, the CPU determines whether or not the vehicle 1 is running. When the vehicle 1 is determined to be running, the flow proceeds to step S2. When the vehicle 1 is determined not to be running, drive power shift control processing is terminated.

(Step S2)

When the vehicle 1 is determined to be running in step S1, the CPU captures the view in front of the vehicle 1 by the camera 14 in step S2, and measures the distance between the vehicle 1 and a predetermined point A (for example, a center line or a curbstone) on the running path so as to calculate the running position of the vehicle 1. Then, the flow proceeds to step S3.

(Step S3)

In step S3, the CPU calculates an estimated running path B based on a speed detected by the speed sensor 12, and a steering angle detected by the steering angle sensor 13. Then, the flow proceeds to step S4.

(Step S4)

In step S4, the CPU calculates an estimated running position 1' of the vehicle on the estimated running path B after a predetermined time interval from a time at the running position of the vehicle 1 calculated in step S2. Then, the flow proceeds to step S5.

(Step S5)

In step S5, the CPU captures the view in front of the vehicle 1 after a predetermined time interval from a time at the running position of the vehicle 1 calculated in step S2, and measures the distance between the vehicle 1 and the predetermined point A so as to calculate an actual running position 1" of the vehicle. Then, the flow proceeds to step S6.

(Step S6)

In step S6, the CPU calculates a sideslip speed of the vehicle 1 based on the difference between the estimated running position 1' of the vehicle calculated in step S4, and the actual running position 1" of the vehicle calculated in step S5. Then, the flow proceeds to step S7.

(Step S7)

In step S7, the CPU determines whether or not the sideslip speed of the vehicle 1 calculated in step S6 is higher than or equal to a predetermined speed. When the sideslip speed of the vehicle 1 is determined to be higher than or equal to the predetermined speed, the flow proceeds to step S8. When the sideslip speed of the vehicle 1 is determined to be lower than the predetermined speed, the flow proceeds to step S9.

(Step S8)

When the sideslip speed of the vehicle 1 is determined to be higher than or equal to the predetermined speed in step S7, the CPU sets the reference boundary line for determination in the roll-over determination map to the second boundary line in step S8, and terminates the processing of switching the reference for determination of sideslip.

(Step S9)

When the sideslip speed of the vehicle 1 is determined to be lower than the predetermined speed in step S7, the CPU sets the reference boundary line for determination in the roll-over determination map to the first boundary line in step S9, and terminates the processing of switching the reference for determination of sideslip.

In this manner, according to the control device for a vehicle in the present embodiment, the sideslip speed which is the moving speed of the vehicle 1 in the width direction is calculated on the basis of the estimated running position 1' of the vehicle after a predetermined time interval has elapsed from a time at a starting position of running on the estimated running path B, and the actual running position 1" of the vehicle after the predetermined time interval has elapsed from the time at the starting position of running on the estimated running path B. Accordingly, an accurate sideslip speed of the vehicle 1 can be obtained, whereby accuracy in the control of the device for the operation and safety of the vehicle 1 can be improved.

In addition, a timing for deploying an air bag is controlled based on the calculated sideslip speed. Consequently, an air bag can be deployed in accordance with a running state of the vehicle 1, whereby the safety of the vehicle can be improved.

Figure 8:
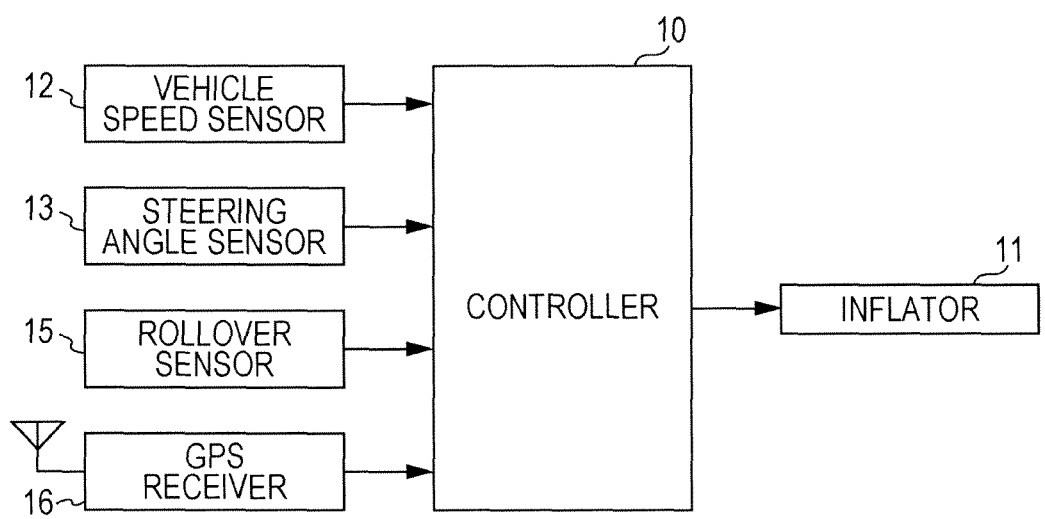
FIG. 8 is a block diagram illustrating a control system in a second embodiment of the present invention.

FIG. 8 illustrates a second embodiment of the present invention. The same components as those in the above-described embodiment are labeled with the same reference symbols.

As illustrated in FIG. 8, in the control device for a vehicle, a GPS receiver 16 is connected to the input side of the controller 10.

The GPS receiver 16 can receive a global positioning signal transmitted from a GPS Satellite (serving as a satellite for global positioning), and can acquire the current position as a result of receiving the global positioning signal.

In the control device for a vehicle configured in the above-described manner, when the controller 10 performs processing of switching the reference for determination of sideslip, the running position of the vehicle 1 is acquired on the basis of a result received by the GPS receiver 16.

In this manner, according to the control device for a vehicle in the present embodiment, the sideslip speed which is the moving speed of the vehicle 1 in the width direction is calculated on the basis of the estimated running position 1' of the vehicle after a predetermined time interval has elapsed from a time at a starting position of running on the estimated running path B, and the actual running position 1" of the vehicle after the predetermined time interval has elapsed from the time at the starting position of running on the estimated running path B. Accordingly, an accurate sideslip speed of the vehicle 1 can be obtained, whereby accuracy in the control of the device for the operation and safety of the vehicle 1 can be improved.

Figure 9:
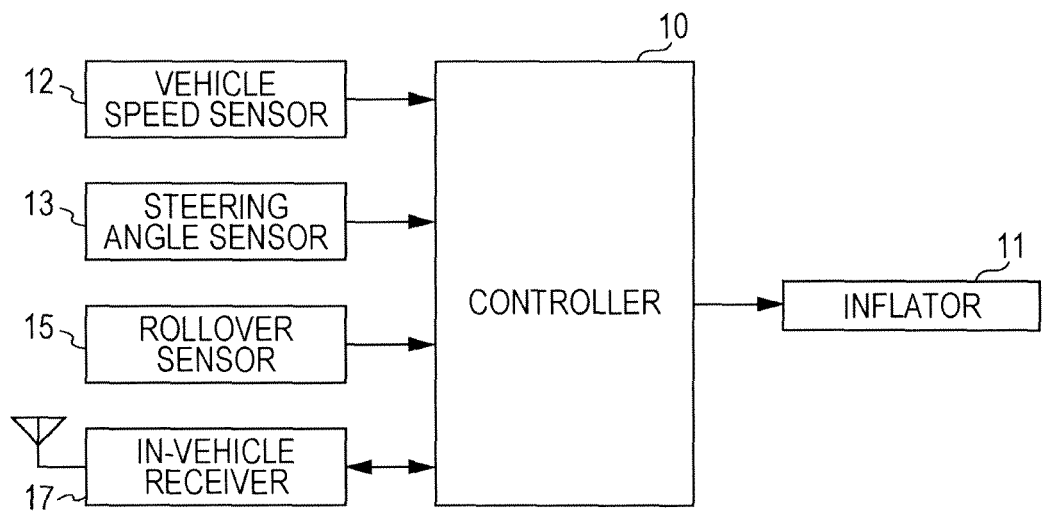
FIG. 9 is a block diagram illustrating a control system in a third embodiment of the present invention.

FIG. 9 illustrates a third embodiment of the present invention. The same components as those in the above-described embodiment are labeled with the same reference symbols.

As illustrated in FIG. 9, in the control device for a vehicle, the controller 10 is connected to an in-vehicle device 17 for receiving a signal regarding information like traffic information such as a radio wave beacon and a light beacon that is transmitted from a transmitter provided on the side of a road where the vehicle 1 runs.

The in-vehicle device 17 can receive a signal regarding the position of the vehicle 1, the signal being transmitted from a transmitter on the side of a road, and can acquire the current position of the vehicle 1 as a result of receiving the signal.

In the control device for a vehicle configured in the above-described manner, when the controller 10 performs processing of switching the reference for determination of sideslip, the running position of the vehicle 1 is acquired from a signal received by the in-vehicle device 17.

In this manner, according to the control device for a vehicle in the present embodiment, the sideslip speed which is the moving speed of the vehicle 1 in the width direction is calculated from the estimated running position 1' of the vehicle after a predetermined time interval has elapsed from a time at a starting running position of the vehicle on the estimated running path B, and the actual running position 1" of the vehicle after the predetermined time interval has elapsed from the time at the starting position of running on the estimated running path B. Accordingly, an accurate sideslip speed of the vehicle 1 can be obtained, whereby accuracy in the control of the device for the operation and safety of the vehicle 1 can be improved.

The control device for a vehicle according to the first embodiment calculates the actual position of the vehicle 1 by capturing the view in front of the vehicle 1 with the camera 14, but the invention is not limited to this. For example, the views in front of and to the rear of the vehicle 1 may be captured with a plurality of cameras so as to calculate the actual position of the vehicle 1. In this case, a yaw angle (the rotation angle around the shaft extending in the vertical direction) of the vehicle 1 can be calculated, whereby the sideslip speed of the vehicle 1 can be calculated more accurately.

The control devices for a vehicle according to the above embodiments use the calculated sideslip speed to control a timing for deploying an air bag, but the invention is not limited to these, and the calculated sideslip speed may be used for a safety device other than the air bag of the vehicle 1, or for controlling the running of the vehicle 1.

The invention claimed is:

1. A sideslip speed calculating device for a vehicle that is provided in the vehicle in accordance with a running state of the vehicle, the sideslip speed calculating device comprising:
   a speed detection unit configured to detect a running speed of the vehicle;
   a steering angle detection unit configured to detect a steering angle of the vehicle;
   an image-capturing unit configured to capture a path on which the vehicle runs or a neighborhood thereof, the image-capturing unit having an output port for sending a signal including image capture data;
   a controller comprising a central processing unit having an input port and an output port, the central processing unit configured to calculate:
      a position of the vehicle based on the signal received via the input port from the image-capturing unit;
      an estimated running path of the vehicle based on the running speed, received via the input port of the controller, from the speed detection unit, a steering angle of the vehicle detected by the steering angle detection unit, and a position of the vehicle; and
      a sideslip speed which is a moving speed of the vehicle in a width direction, on the basis of an estimated running position of the vehicle on an estimated running path after a predetermined time interval has elapsed from a time at a starting running position of the vehicle, and an actual running position of the vehicle on the estimated running path after the predetermined time interval has elapsed from the time at the starting running position of the vehicle, the estimated running path being calculated by the central processing unit.

2. A device for a vehicle comprising:
   the sideslip speed calculating device according to claim 1, and
   an air bag device including:
      an air bag; and
      an inflator,
   wherein the air bag is deployed by the inflator, based on a reference value received via the controller, in the cabin inward from a side of the vehicle, and
   wherein the reference for deploying the air bag is changed on the basis of a result of the sideslip speed calculation made by the central processing unit.

3. The sideslip speed calculating device for a vehicle according to claim 1, wherein the central processing unit is further configured to calculate the sideslip speed of the vehicle based on a difference between the estimated running position of the vehicle and the actual running position of the vehicle.

4. A sideslip speed calculating device for a vehicle that is provided in the vehicle in accordance with a running state of the vehicle, the sideslip speed calculating device comprising:
   a speed detection unit configured to detect a running speed of the vehicle;
   a steering angle detection unit configured to detect a steering angle of the vehicle;
   a position acquisition unit configured to acquire a position of the vehicle by receiving a signal from a satellite for positioning; and
   a controller comprising a central processing unit having an input port and an output port, the central processing unit being configured to calculate:
      an estimated running path of the vehicle based on the running speed, received via the input port of the controller, from the speed detection unit, a steering angle of the vehicle detected by the steering angle detection unit, and a position of the vehicle acquired by the position acquisition unit; and
      a sideslip speed which is a moving speed of the vehicle in a width direction, on the basis of an estimated running position of the vehicle on an estimated running path after a predetermined time interval has elapsed from a time at a starting running position of the vehicle, and an actual running position of the vehicle on the estimated running path after the predetermined time interval has elapsed from the time at the starting running position of the vehicle, the estimated running path being calculated by the central processing unit.

5. A device for a vehicle comprising:
   the sideslip speed calculating device according to claim 4, and
   an air bag device including:
      an air bag; and
      an inflator,
   wherein the air bag is deployed by the inflator, based on a reference value received via the controller, in the cabin inward from a side of the vehicle, and
   wherein the reference for deploying the air bag is changed on the basis of a result of the sideslip speed calculation made by the central processing unit.

6. The sideslip speed calculating device for a vehicle according to claim 4, wherein the central processing unit is further configured to calculate the sideslip speed of the vehicle based on a difference between the estimated running position of the vehicle and the actual running position of the vehicle.

7. A sideslip speed calculating device for a vehicle that is provided in the vehicle in accordance with a running state of the vehicle, the sideslip speed calculating device comprising:
   a speed detection unit configured to detect a running speed of the vehicle;
   a steering angle detection unit configured to detect a steering angle of the vehicle;
   a position acquisition unit configured to acquire a position of the vehicle by receiving a signal from a side of a road on which the vehicle runs; and a controller comprising a central processing unit having an input port and an output port, the central processing unit being configured to calculate:
an estimated running path of the vehicle based on the running speed, received via the input port of the controller, from the speed detection unit, a steering angle of the vehicle detected by the steering angle detection unit, and a position of the vehicle acquired by the position acquisition unit; and
a sideslip speed which is a moving speed of the vehicle in a width direction, on the basis of an estimated running position of the vehicle on an estimated running path after a predetermined time interval has elapsed from a time at a starting running position of the vehicle, and an actual running position of the vehicle on the estimated running path after the predetermined time interval has elapsed from the time at the starting running position of the vehicle, the estimated running path being calculated by the central processing unit.

8. A device for a vehicle comprising:
the sideslip speed calculating device according to claim 7, and
an air bag device including:
an air bag; and
an inflator,
wherein the air bag is deployed by the inflator, based on a reference value received via the controller, in the cabin inward from a side of the vehicle, and
wherein the reference for deploying the air bag is changed on the basis of a result of the sideslip speed calculation made by the central processing unit.

9. The sideslip speed calculating device for a vehicle according to claim 7, wherein the central processing unit is further configured to calculate the sideslip speed of the vehicle based on a difference between the estimated running position of the vehicle and the actual running position of the vehicle.

* * * * *